Dec. 10, 1963

R. B. COTTON 3,113,751

AERIAL CARGO DELIVERY SYSTEM

Filed Dec. 28, 1962

INVENTOR
Robert B. Cotton

BY *Herbert M. Birch*

ATTORNEY

Dec. 10, 1963    R. B. COTTON    3,113,751
AERIAL CARGO DELIVERY SYSTEM
Filed Dec. 28, 1962    3 Sheets-Sheet 2

INVENTOR
Robert B. Cotton

BY *Herbert M. Birch*

ATTORNEY

INVENTOR
Robert B. Cotton
BY Herbert M. Birch
ATTORNEY

United States Patent Office 3,113,751
Patented Dec. 10, 1963

3,113,751
AERIAL CARGO DELIVERY SYSTEM
Robert B. Cotton, Media, Pa., assignor to All American Engineering Company, Wilmington, Del., a corporation of Delaware
Filed Dec. 28, 1962, Ser. No. 248,011
20 Claims. (Cl. 244—137)

This application is a continuation-in-part of my co-pending application Serial No. 132,088, filed August 17, 1961, now Patent No. 3,096,055, for an "Aerial Cargo Delivery System."

This invention relates to systems for dropping cargo from aircraft and more particularly for dropping cargo from low flying aircraft with pinpoint accuracy.

Present day systems for dropping either animate or inanimate cargo from an aircraft at a designated destination require that the aircraft be flying at an altitude sufficient for a parachute to properly function and lower the cargo to the ground.

Also, present day systems are adversely affected by local wind conditions and the like whereby dropped cargo may drift for several miles from the desired contact point before being deposited on the ground. Because of this problem a large amount of cargo is lost or damaged.

Another disadvantage of present day cargo delivery system is that tremendous quantities of components utilized therein, such as cables and parachutes, must of necessity be expended at the cargo delivery point. Thus, the equipment cost of cargo delivery operations is very high.

A primary object of this invention is to provide an aerial cargo delivery system for dropping cargo from an aircraft to a ground position, whereby the drag load from a relatively small parachute being pulled through the air by the aircraft is used to extract the cargo from the aircraft and decelerate the cargo to zero ground velocity.

Another object of this invention is to provide a novel aerial cargo delivery system, whereby the same equipment may be used for a plurality of successive cargo drops.

Still another object of this invention is to provide a novel low level aerial cargo delivery system, wherein the cargo is decelerated from the velocity of the aircraft to zero ground velocity immediately prior to engagement with the ground.

Still another object of this invention is to provide an aerial cargo delivery system, wherein a single drag chute is used to both extract the cargo from an aircraft and deposit the cargo on the ground, the drag chute being automatically decoupled from the said cargo and returned to the said aircraft after each cargo drop for use with succeeding drops.

Still another object of this invention is to provide an aerial cargo delivery system wherein a single drag chute is used to both extract the cargo from an aircraft and deposit the cargo on the ground and wherein said drag chute is first ejected from said aircraft a predetermined distance at the initiation of each cargo drop.

Still another object of this invention is to provide an aerial cargo delivery system wherein a single drag chute is used to both extract the cargo from an aircraft and deposit the cargo on the ground at a velocity, with respect to the said ground, wherein both the horizontal and vertical components of velocity are substantially equal to zero.

Still another object of this invention is to provide an aerial cargo delivery system whereby cargo may be dropped from an aircraft to a ground position and accurately and repeatedly be deposited in a predesignated limited area at the point of delivery, regardless of ambient ground and meteoroligical conditions.

Still another object of this invention is to provide an aerial cargo delivery system whereby the area of the parachutes used therein may be reduced to at least twenty times smaller than that used in a normal parachute drop.

Still another object of this invention is to provide an aerial cargo delivery system whereby the kinetic energy of the aircraft is utilized to eject the cargo from the aircraft and subsequently decelerate the cargo to zero ground velocity.

Still another object of this invention is to provide an aerial cargo delivery system whereby the cargo is decelerated to zero ground velocity after being ejected from an aircraft and complete control is maintained over the said cargo during deceleration.

Still another object of this invention is to provide an aerial cargo delivery system whereby the amount and weight of equipment necessary to the dropping of cargo is reduced, thereby increasing the pay-load of the aircraft used.

Still another object of this invention is to provide an aerial cargo delivery system whereby complete control is maintained during a cargo drop over all of the equipment necessary to deliver a cargo to the ground from an aircraft.

Still another object of this invention is to provide an aerial cargo delivery system wherein the cargo is delivered from a moving airborne body to a receiving body moving at a different velocity from said airborne body.

Yet another object of this invention is to provide an aerial cargo delivery system whereby such a high degree of controlled reliability is attainable as to make the said system suitable for the delivery of personnel as well as cargo.

Yet another object of the invention is to provide an aerial cargo delivery system wherein the cargo is decelerated from the velocity of the aircraft to zero velocity relative to a receiving body or station and wherein means is provided at said receiving body or station for indicating to personnel in said aircraft the altitude of said aircraft with respect to said receiving body or station.

Yet another object of this invention it to provide an aerial cargo delivery system wherein the cargo is decelerated from the velocity of the aircraft to zero velocity relative to a receiving body or station and wherein means is provided at said receiving body or station for indicating to personnel in said aircraft the altitude of said aircraft with respect to said receiving body or station, said indicating means comprising a tethered target balloon.

Yet another object of this invention is to provide an aerial cargo delivery system for dropping cargo from an aircraft to a receiving station, wherein the drag load from a small parachute being pulled through the air by said aircraft is used to extract the cargo from said aircraft and decelerate the cargo to zero ground velocity, said parachute being tethered to said aircraft by a novel towing and release means.

These and other objects of the invention will become apparent by reference to the following specification and drawings which relate to several preferred embodiments of the invention.

Figure 1:
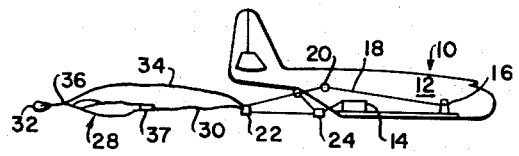
FIGURE 1 shows the first step in a cargo drop using the system of the invention.
Figure 2:
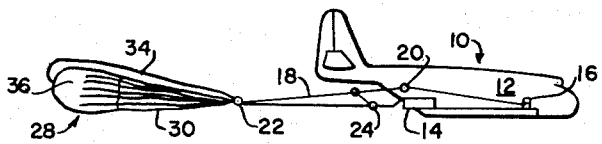
FIGURE 2 shows the next step in a cargo drop from that shown in FIGURE 1.
Figure 3:
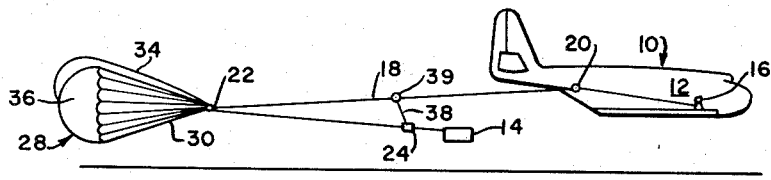
FIGURE 3 shows the next step in a cargo drop from that shown in FIGURE 2.
Figure 4:
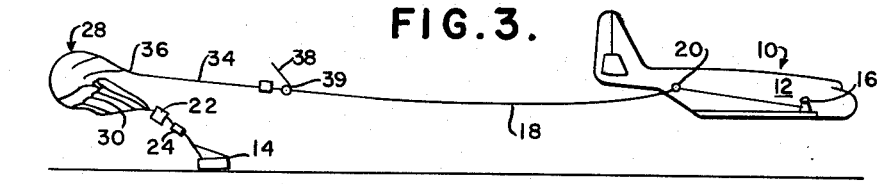
FIGURE 4 shows the next step in a cargo drop from that shown in FIGURE 3.
Figure 5:
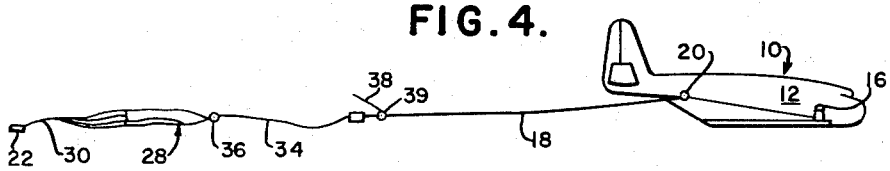
FIGURE 5 shows the final step in a cargo drop using the system of the invention.

Basically this invention comprises a system which utilizes the controlled drag of a parachute to extract a cargo from an aircraft and decelerate same from the velocity of the aircraft to a zero velocity with respect to the ground. The system is particularly well adapted for low altitude cargo drops such as those made under fifty (50) feet and is capable of depositing a cargo on the ground or a receiving body at a relative velocity with respect to said ground or receiving body which is equal to zero in both the vertical and horizontal components of velocity.

The cargo is attached to one end of a cable which is reeved around a sheave or free pulley structure to which is attached a single parachute, hereinafter referred to as a drag chute, from whence the other end of the cable is returned to a fixed point within the aircraft where it is anchored. The fixed point may be adjusted as to the length of cable between it and the cargo by placing a winch at the fixed point by which cable may be stored, extended or retracted at will.

Referring in detail to the drawings and more particularly to FIGURES 1 through 6, an aircraft 10 having cargo hold 12 open at the rear of the aircraft 10 is shown as containing a cargo 14 and a winch 16.

A cable 18 extends from the winch 16 over a fixed pulley 20 mounted on the aircraft 10 and extends, as shown, from the fixed pulley 20 to a free pulley or sheave assembly 22. The cable 18 is reeved through the sheave assembly 22 and extends therefrom back towards the aircraft 10 to one side of a release means 24. The other side of the release means 24 is connected to a cargo harness 26 by which the cargo 14 is attached to the main cable 18.

Coupled to the sheave assembly 22, by means to be hereinafter described, is a drag parachute 28 having shroud lines 30 and a pilot chute 32 thereon. An additional line, hereinafter referred to as a static line 34, extends from the sheave assembly 22 to the apex 36 of the parachute 28 for a purpose to be hereinafter described.

A reefing ring 37 may be provided to initially maintain the parachute 28 in a reefed condition.

In order to permit extremely low level cargo deliveries to be made, i.e. those in which the aircraft is clearing the ground or the receiving body by less than thirty (30) feet, an auxiliary or anti-gravity line 38 is connected from a point adjacent the release coupling 24 to that span of towline 18 which lies between the sheave assembly 22 and the fixed pulley 20 in the aircraft 10. A sliding ring or loop 39 is provided on the towline 18 so that the auxiliary line 38 can readily follow the cargo 14 and the release coupling 24 towards the sheave assembly 22 during the cargo delivery cycle. The means for coupling the auxiliary line 38 adjacent to the release coupling 24 will be more fully described in conjunction with the description of FIGURE 7.

Figure 7:
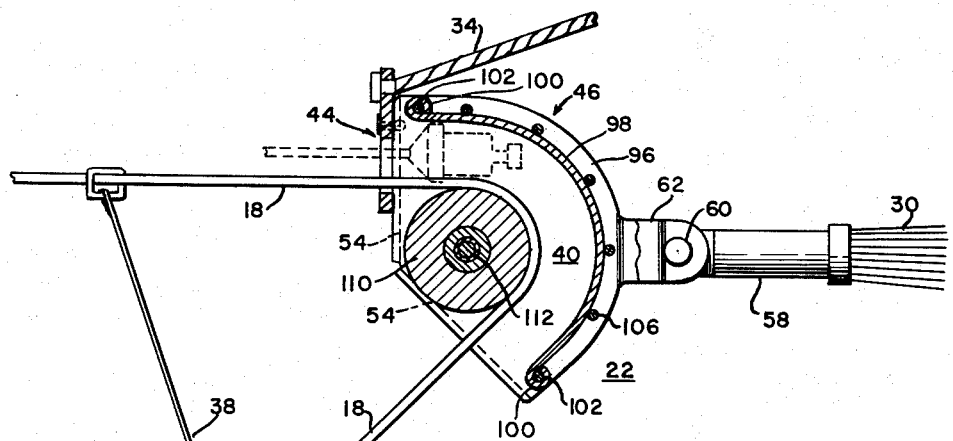
FIGURE 7 is a side elevation in partial cross section of a release coupling and sheave assembly of the present invention.

Referring now to FIGURE 7, the sheave assembly 22 is shown as comprising a hooded pulley means 40, through which is reeved the main cargo cable or towline 18, and a parachute spilling means, to be hereinafter more fully described, whereby the parachute 28 is spilled immediately after the cargo release 24 is disengaged. The static line 34 of the parachute 28 is directly connected in a bore 42 or the like integral with a towline guide means 44 which is releasably positioned across a portion of the open side of the pulley housing 46 by means of a plurality of cotter pins 48 extending through coaxial bores 50 and 52 in the line guide means 44 and integral external flange means 54 on the pulley housing 46, respectively. A rectangular guide slot 56 is provided in the line guide 44 for passage of the tow tape 18.

The shroud lines 30 of the parachute 28, are connected via a link 58 to a pin 60 extending transversely through a pair of integral ears 62 on the pulley housing 46.

The parachute spilling means includes the line guide means 44, already described, and in addition includes an actuating means 64 comprising a generally frusto-conical detent 66 integral with a cylindrical shank portion 68 which ultimately forms a portion of the cargo release coupling 24 as will be hereinafter more fully described.

The means for retaining the auxiliary line 38 adjacent the release coupling 24 comprises a flat retaining ring or washer 70 mounted concentrically on the shank 68 to the release actuator 64, between the release coupling 24 and an annular boss 72 on the integral detent 66. The retaining ring 70 is adapted to slide axially along the shank 68 as will be more fully described with respect to the operation of the cargo release means 24.

Figure 9:
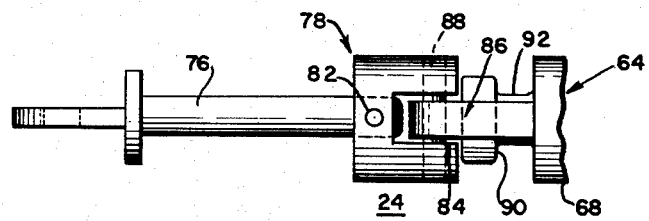
FIGURE 9 is a top plan view of the internal portion of the release coupling of FIGURE 7.

Referring jointly to FIGURES 7 and 9, the cargo release means 24 is shown as comprising a hollow cup-shaped housing 74 concentrically and slidably enclosing an axially disposed cargo coupling shank 76 having an enlarged cylindrical head portion 78 which is adapted to prevent movement of said coupling shank 76 out of the substantially closed end of the housing 74, the said housing being upset to form internal bosses 80 which engage the said head portion 78. Thus, the housing 74 is indexed in one direction of movement with respect to the head portion 78 of the coupling shank 76. A diametrically disposed retaining pin 82 holds the head 78 on the shank 76.

The head portion 78 includes a diametrically and longitudinally disposed cut or cavity 84 such that in top plan view, i.e. FIGURE 9, the head portion 78 is bifurcated. A pair of dogs 86 are mounted via pivot pins 88 which transversely bridge the cavity 84.

The dogs 86 are flush with the surface of the head portion 78 in the closed position so that the outer housing 74 of the coupling means 24 will retain them in closed position when the internal bosses 80 are engaged with the head portion 78.

When the dogs 86 are in closed position they engage an annular reduced diameter shoulder 90 on the tip end of the shank 68 of the parachute spilling actuator 64. An annular channel 92 is provided adjacent the shoulder 90 to permit the dogs 86 to seat therein in juxtaposition with the said annular shoulder 90.

The inner open end of the coupling housing 74 is provided with an annular flange 94 against which the coupling ring 70 is adapted to abut during the automatic uncoupling of the cargo. This feature will be more fully described in conjunction with the description of operation of the invention.

When heavy loads are imparted to the tow cable 18 and the tow cable is fabricated as conventional twisted cable or nylon rope, an undue amount of spin is imparted to the sheave assembly 22, parachute 28 and cargo 14 due to the tendency of this type of cable to untwist under high tensile loading. This effect is obviated by the use of flat tape such as woven is braided nylon tape for the tow cable 18.

Figure 10:
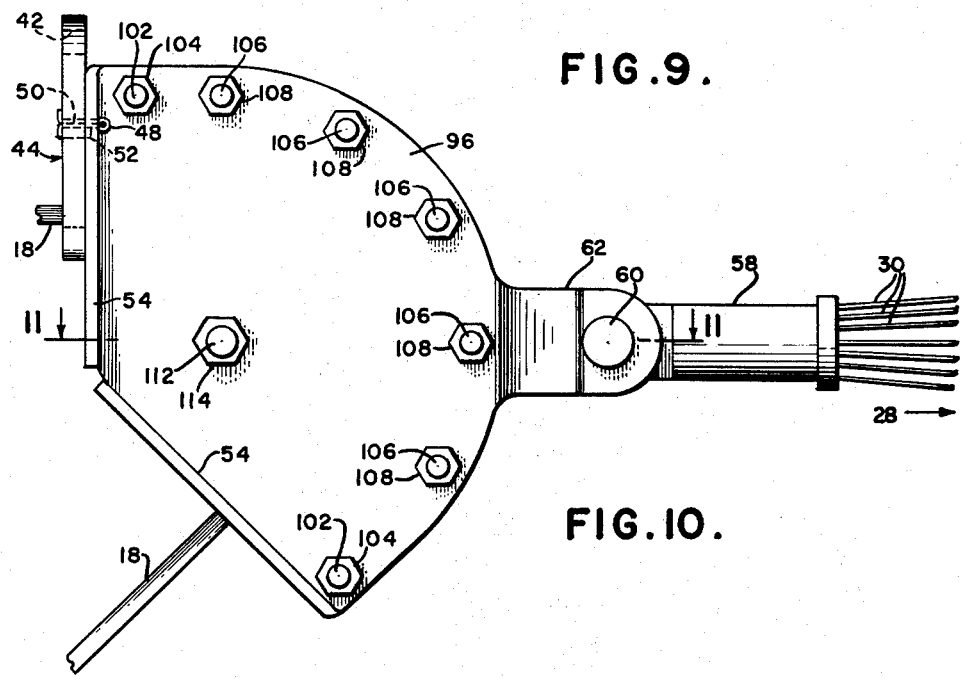
FIGURE 10 is a side elevation of the pulley housing of the sheave assembly of FIGURE 7.
Figure 11:
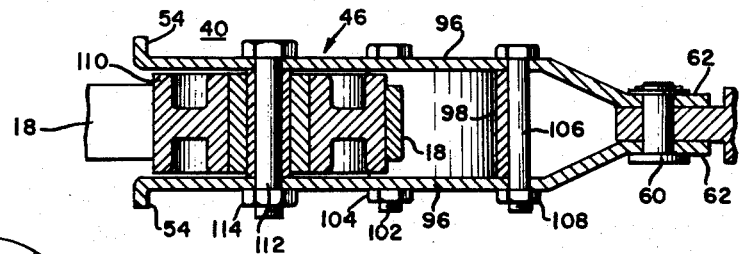
FIGURE 11 is a cross section taken along line 11—11 of FIGURE 10.
Figure 12:
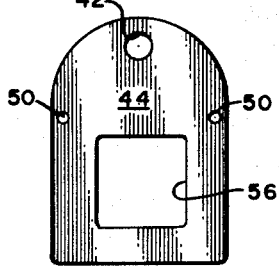
FIGURE 12 is a front elevation of the towline guide means of FIGURE 7.

Referring to FIGURES 10, 11 and 12 the pulley or sheave structure 40 of the invention will now be described.

The sheave housing 46 is shown as comprising a pair of side plates 96, having an arcuate shape over a portion of their periphery, separated by a curvilinear spacer plate 98 coextensive with the said arcuate portions of the plates 96 whereby a three sided pulley or sheave housing 46 is effected.

The arcuate spacer plate 98 is upset at each end to form integral through-ports 100 for receiving anchor bolts or splines 102 which extend through both side plates 96 and are ultimately secured by means of nuts 104.

A plurality of additional reinforcing studs or splines 106, secured by nuts 108 are conformally positioned with respect to the shape of the arcuate spacer plate 98 transversely through the two side plates 96.

A sheave or pulley cylinder 110 is mounted internally of the housing 44 on an axis of rotation provided by a spline or bolt 112 extending transversely through the two side plates 96 and secured therein by a nut 114.

The difference between the radius of the pulley cylinder 110 and the radius of curvature of the spacer plate 98 about the pulley axis 112 is sufficient to permit the detent 66 and shank 68 of the actuating means 64 to pass completely through the housing 46 and engage the line guide 44. The rectangular guide slot 56 in the line guide 44 is dimensioned to permit free passage of the towline or tape 18 but will prevent passage therethrough of the detent 66 on the chute spilling actuator means 64.

Figure 8:
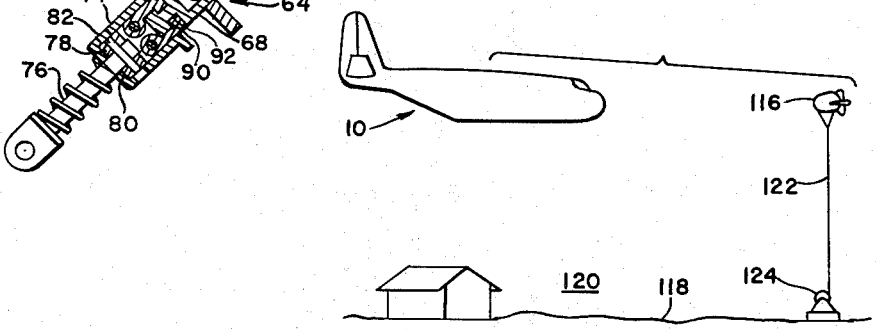
FIGURE 8 is a schematic representation of an embodiment of the invention wherein an aerial target means tethered to the cargo receiving body or station is utilized.

Referring now to FIGURE 8, an additional embodiment of the invention is shown as including a readily destructible balloon target 116 tethered to the ground 118 or otherwise integrally associated with a receiving station or body 120 by means of a cable 122 or the like. The cable 122 may be wound on a winch 124 whereby the altitude of the balloon target 116 may be selectively determined with respect to the receiving station 120.

Operation

Figure 6:
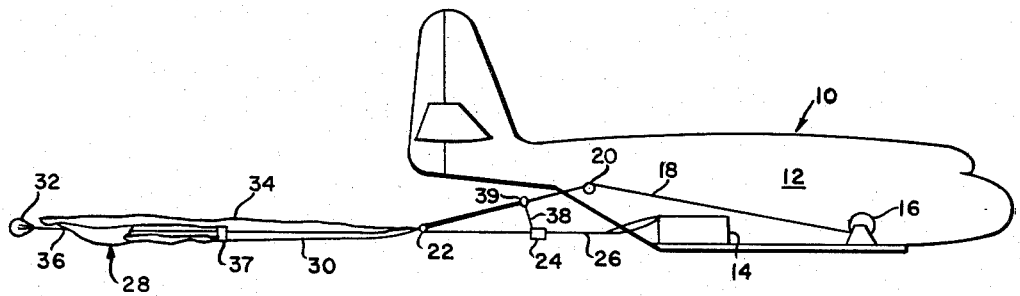
FIGURE 6 is an enlarged showing of FIGURE 1.

Referring first to FIGURES 1 and 6, the parachute or drag chute 28 is first placed in a reefed condition by the reefing ring 37. Assuming now that the cargo 14 has been releasably coupled to the tow tape 18 by the cargo release means 24 (FIG. 7), the reefed parachuute 28 and the sheave assembly 22 are payed out of the aircraft 10 to a predetermined distance therefrom, the said distance being a function of the velocity of the aircraft 10 relative the receiving body or station 120 (FIG. 8).

This distance is also a function of the drag on the parachute 28, and the mass of the particular cargo 14, whereby the drag of the parachute acting on the cargo 14 will be sufficient to accelerate the cargo 14 to a velocity which is exactly equal and opposite to that of the aircraft at the time the cargo 14 is released from the cable 18, thus decelerating the cargo 14 and delivering same onto the ground at zero velocity. Since the force of gravity is acting on the cargo 14 and since the cargo 14 will not be pulled from the plane by the parachute along a path exactly horizontal with the ground, the distance of pay-out may be regulated such that the angle of approach of the cargo 14 to the sheave assembly 22 during the deceleration process may effectively cancel the vertical component of cargo velocity and the cargo 14 may gently be placed on the ground with no apparent impact. The vertical effect is best achieved by removing the auxiliary line 38 from the system.

Once the parachute 28 has been payed out to the proper distance the reefing ring 37 is broken, as by detonating or the like, and the parachute 28 opens and drags the cargo 14 from the hold 12 of the aircraft 10.

The cargo 14 and the cable 18 are accelerated on the cargo side of the sheave assembly 22 in a direction opposite that of the aircraft 10 until the cargo release coupling 24 engages the sheave assembly 22.

Most cargo will withstand a vertical velocity of twenty-five (25) feet-per-second prior to its impact with the ground, this being the maximum velocity for a fifteen (15) foot free fall of a mass.

By the use of the auxiliary line 38, which minimizes the vertical acceleration of the cargo 14 by constraining it to closely follow the span of tow tape 18 from the fixed pulley 20 to the sheave 22 the aircraft 10 can be flown above the receiving body or station 120 at an altitude of thirty (30) feet or less and the cargo 14 will be deposited on the ground or other desired surface at a zero horizontal velocity with respect to the ground and a vertical velocity with respect to the ground of less than twenty-five (25) feet-per-second.

When it is desired to utilize the vertical acceleration of which the delivery system is capable and also when the low level (thirty foot altitude) delivery is to be made, the altitude of the aircraft 10 becomes critical.

Referring to FIGURE 8, the delivery of cargo is effected by flying the aircraft 10 directly into the target balloon 116 which will cause the nose of the aircraft to burst the balloon. The altitude of the balloon 116 above the ground 118 is prearranged or mutually agreed upon by radio contact between the aircraft 10 and the ground station 120. Thus, the pilot and crew of the aircraft 10, knowing their airspeed and their exact altitude may select the proper payout distance for the tow tape 18 and the parachute 28 and sheave assembly 22 thereon to deliver the cargo 14 onto the ground 118 at a zero ground velocity.

Referring now to FIGURES 7, 9, 10, 11 and 12, the actual release of the cargo 14 from the tow tape 18 via the cargo release means 24 and the simultaneous spilling of the parachute 28 via the actuator 64 and sheave assembly 22 will now be described.

The forward flange 94 on the hollow release housing 74 is dimensioned such that if the retaining ring 70 and auxiliary line 38 are not present on the shank portion 68 of the chute spilling actuator means 64, the flange 94 will abut the outturned flanges 54 on the side plates 96 of the pulley housing 46. Thus, as the cargo 14 is accelerated away from the aircraft, the release coupling 24 will eventually engage the sheave assembly 22 such that the flanges 54 on the pulley housing 46 will either engage the retaining ring 70 and drive it into engagement with the shoulder 94 or the said flanges 54 will directly abut the shoulder 94. The result in either case is to drive the coupling housing 74 back along the head portion 78 while the actuator means 64 and head portion 78 tend to travel into the pulley housing 46. This exposes the dogs 86 and results in disengagement of the dogs from the annular shoulder or boss 90 on the shank 68 of the actuator means 64 whereby the cargo 14 is now completely released from the tow tape 18.

At this point the flat tow tape 18 continues to be guided by and feed through the guide slot 56 in the line guide means 44. The actuator means 64 follows the tow tape 18 through the pulley housing 46, around the pulley 110, until the frusto-conical detent 66 engages the inner side of the line guide means 44 peripherally of the guide slot 56 therein. The resulting impact of the detent 66 on the guide means 44 causes the cotter pins 48 to overload and fail. This constrains the static line 34 of the chute 28 to follow the top tape 18 and line guide means 44 and completely disengages the entire pulley housing 46 from the tow tape 18. Thus, the load is removed from the shroud lines 30 via the link 58, pin 60 and integral ears 62 permitting the static line 34 to spill the chute 28, whereafter it is retrievable into the aircraft 10 by the winch 16 with a minimum of drag resistance.

As can be seen from the foregoing specification and drawings the present invention provides means whereby the versatility of aerial cargo delivery systems of the type described may be augmented.

It is to be understood that the various embodiments of the invention shown and described herein are for the purpose of example only and are not intended to limit the scope of the appended claims.

What is claimed is:

1. A cargo delivery system for delivering a cargo from a moving aircraft to a ground station comprising an aircraft, a cargo carried by said aircraft, a cable fixed at one end in said aircraft, said cable being connected at its other end to said cargo, a sheave, said cable being reefed on said sheave intermediate the ends thereof, a parachute mounted on said sheave and a releasable cargo coupling between said cargo and the other end of said cable having sheave engaging actuating means thereon, and an auxiliary retaining means connected between said releasable cargo coupling and said cable at a point intermediate said sheave and said one end of said cable to substantially prevent vertical acceleration of said cargo by said system by constraining said cargo to a position adjacent to that portion of said cable extending from said one end to said sheave, whereby the drag of said parachute on said sheave is transmitted to said cable to cause said cargo to be extracted from said aircraft and accelerated thereby in a direction opposite to that of said aircraft, along said cable and toward said sheave, until such time as said sheave engaging actuating means on said releasable cargo coupling contacts said sheave and releases said cargo from said cable.

2. The invention defined in claim 1, wherein said cable comprises a flat tape.

3. The invention defined in claim 1, wherein said parachute is releasably coupled at one end to said sheave by a static line connected from said sheave to the apex of said parachute and said parachute is fixedly connected at its other end to said sheave by the shroud lines of said parachute.

4. The invention defined in claim 1, wherein said parachute is releasably coupled at one end to said sheave by a static line connected from said sheave to the apex of said parachute and said parachute is fixedly connected at its other end to said sheave by the shroud lines of said parachute; wherein said releasable cargo coupling includes integral actuating means, said cable adapted to be released from said releasable cargo coupling simultaneously with the release of said cargo means from said cable; and wherein said sheave includes connecting means for said static line, and frangible means mounting said connecting means on said sheave; said integral actuating means being adapted to forceably engage said connecting means whereby said frangible means are destroyed and said connecting means is disengaged from said sheave causing said parachute to spill immediately subsequent to the release of said cargo from said cable.

5. The invention defined in claim 1, wherein said system further includes tethering means at said ground station and an airborne target means tethered to said ground station by said tethering means and adapted to be engaged by said aircraft immediately prior to the delivery of said cargo by said system.

6. The invention defined in claim 1, wherein said sheave comprises a three-sided pulley housing, a pulley within said housing and defining openings therewith whereby said tow cable may be reeved around said pulley and a line guide means releasably connected across one of said openings and including a guide orifice therein for said cable.

7. The invention defined in claim 6, wherein said cable comprises a flat tape and said guide orifice is rectangular.

8. The invention defined in claim 1, wherein said system further includes tethering means at said ground station and an airborne target means tethered to said ground station by said tethering means and adapted to be engaged by said aircraft immediately prior to the delivery of said cargo by said system, said tethering means comprising a winch and a cable wound on said winch and connected to said airborne target means whereby the altitude of said target means with respect to said ground station may be selectively determined.

9. A cargo delivery system for delivering a cargo from a moving aircraft to a ground station comprising an aircraft, a cargo carried by said aircraft, a cable fixed at one end in said aircraft, said cable being connected at its other end to said cargo, a sheave, said cable being reeved on said sheave intermediate the ends thereof, a parachute mounted on said sheave and a releasable cargo coupling between said cargo and the other end of said cable having sheave engaging actuating means thereon, whereby the drag of said parachute on said sheave is transmitted to said cable to cause said cargo to be extracted from said aircraft and accelerated thereby in a direction opposite to that of said aircraft until such time as said sheave engaging actuating means on said releasable cargo coupling contacts said sheave and releases said cargo from said cable; tethering means at said ground station and an airborne target means tethered to said ground station by said tethering means and adapted to be engaged by said aircraft immediately prior to the delivery of said cargo by said system, whereby the proper altitude and position of said aircraft with respect to said ground station is assured.

10. The invention defined in claim 9, wherein said tethering means comprises a winch and a cable wound on said winch and connected to said airborne target means, whereby the altitude of said target means with respect to said ground station may be selectively determined.

11. In an aerial cargo delivery system in an aircraft for delivering a cargo from a moving aircraft to a ground station and including an aircraft and a cargo carried by said aircraft, means carried by said aircraft for decelerating said cargo from the velocity of said aircraft to a substantially zero velocity with respect to said ground station while said cargo is under the control of said system and release means coordinated with said means for releasing said cargo from said system when the velocity of said cargo with respect to said ground station is substantially equal to zero; and an airborne target means at said ground station, said target means being constrained to a predetermined altitude above said ground station and adapted to be engaged by said aircraft immediately prior to the delivery of said cargo by said system.

12. In an aerial cargo delivery system in an aircraft for delivering a cargo from a moving aircraft to a ground station and including an aircraft and a cargo carried by said aircraft, means carried by said aircraft for acclerating said cargo in a direction opposite to the velocity of said moving aircraft for a time sufficient to decelerate said cargo from the velocity of the aircraft to a predetermined velocity with respect to said ground station while said cargo is under the control of said system and release means coordinated with said means for releasing said cargo from said system when the velocity of said cargo with respect to said ground station is substantially equal to said predetermined velocity; and an airborne target means at said ground station, said target means being constrained to a predetermined altitude above said ground station and adapted to be engaged by said aircraft immediately prior to the delivery of said cargo by said system.

13. In an aerial cargo delivery system including an aircraft, a cargo carried by said aircraft, a ground station, and adjustable means in said aircraft for accelerating said cargo out of said aircraft and toward said ground station such that said cargo is travelling at a predetermined velocity with respect to said ground station upon arrival at said ground station, said velocity being a function of the setting of said adjustable means and the altitude of said aircraft above said ground station, the invention comprising an airborne target means constrained at a predetermined altitude above said ground station and adapted to be engaged by said aircraft immediately prior to the delivery of the cargo by said system, whereby the relative velocity of said cargo with respect to said ground station when delivered thereto may be selectively varied by said adjustable means.

14. In a cargo delivery system in an aircraft for delivering a cargo from a moving aircraft to a ground station, and including an aircraft and a cargo carried by said aircraft, means for accelerating said cargo in a direction opposite to the velocity of said moving aircraft to selectively vary the velocity of said cargo with respect to said ground station comprising a cable fixed at one end in said aircraft and connected at its free end to said cargo, a sheave, said cable being reeved on said sheave intermediate the ends thereof, and a parachute connected to said sheave, whereby the drag on said parachute will cause said parachute and said sheave to move along said cable in a direction opposite to the velocity of said aircraft and cause said cargo and the free end of said cable to accelerate in the same direction; and an auxiliary retaining means connected between a point on said cable adjacent said cargo and at a point on said cable intermediate said sheave and said one end of said cable to substantially prevent vertical acceleration of said cargo by said system by constraining said cargo to a position adjacent that portion of said cable extending from said one end of said sheave.

15. The invention defined in claim 14, wherein said cable comprises a flat tape.

16. A cargo drag parachute comprising a sheave, a canopy and shroud lines both connected to said sheave, a release assembly interconnecting said sheave and said canopy, a cargo drag cable reefed around said sheave, and means associated with said sheave and said drag cable for actuating said release assembly to disconnect said canopy from said sheave and connect said canopy with said drag cable.

17. In an aerial cargo delivery system including a moving airborne body, a cargo carried by said airborne body, and a receiving station for delivering said cargo from said moving airborne body to said receiving station wherein there is a difference in velocity between said airborne body and said station, means carried by said airborne body for accelerating said cargo from said airborne body in such a direction to overcome said difference in velocity, and release means coordinated with the first of said means for releasing said cargo from said system when the difference in velocity between said cargo and said airborne body is substantially equal to the said difference between said receiving station and said airborne body; and an airborne target means at said ground station, said target means being constrained to a predetermined altitude above said ground station and adapted to be engaged by said aircraft immediately prior to the delivery of said cargo by said system.

18. In an aerial delivery system including a first moving body, a second body carried by said first body and a third body moving at a velocity different from said first body, means for accelerating said second body away from said first body until the relative velocity between said second and third bodies reaches a predetermined value comprising a drag body, a sheave fastened to said drag body, a cable fixed at one end to said first body and secured at its other end to said second body, said cable being reeved on said sheave intermediate the said ends thereof, and release means coordinated with said sheave for releasing said second body from said cable when the velocity of said second body relative to said third body reaches said predetermined value; and means for substantially preventing vertical acceleration of said cargo comprising retaining means connected between said release means and a point on said cable intermediate said sheave and said one end of said cable, whereby said cargo is constrained to a position adjacent that portion of said cable extending from said one end to said sheave.

19. The invention defined in claim 18, wherein said cable comprises a flat tape thereby eliminating the tendency of said cable to twist under high tensile loads.

20. In an aerial delivery system including a first moving body, a second body carried by said first body and a third body moving at a velocity different from said first body, means for accelerating said second body away from said first body until the relative velocity between said second and third bodies reaches a predetermined value comprising a drag body, a sheave fastened to said drag body, a cable fixed at one end to said first body and secured at its other end to said second body, said cable being reeved on said sheave intermediate the said ends thereof, and release means coordinated with said sheave for releasing said second body from said cable when the velocity of said second body relative to said third body reaches said predetermined values; said cable comprising a flat tape, whereby the tendency of said cable to twist under high tensile loads is eliminated.

References Cited in the file of this patent
UNITED STATES PATENTS

| | | |
|---|---|---|
| 1,812,955 | Horni | July 7, 1931 |
| 2,076,476 | Mores | Apr. 6, 1937 |
| 2,477,907 | Smith | Aug. 2, 1949 |
| 2,950,887 | Hidding | Aug. 30, 1960 |